(12) United States Patent
Wang et al.

(10) Patent No.: US 11,425,574 B2
(45) Date of Patent: Aug. 23, 2022

(54) ELECTRONIC DEVICE AND METHOD FOR WIRELESS COMMUNICATION, AND COMPUTER READABLE STORAGE MEDIUM

(71) Applicant: Sony Corporation, Tokyo (JP)

(72) Inventors: Song Wang, Beijing (CN); Qimei Cui, Beijing (CN); Tao Cui, Beijing (CN); Yuxuan Xie, Beijing (CN); Huiling Zuo, Beijing (CN)

(73) Assignee: SONY CORPORATION, Tokyo (JP)

( * ) Notice: Subject to any disclaimer, the term of this patent is extended or adjusted under 35 U.S.C. 154(b) by 77 days.

(21) Appl. No.: 16/963,505

(22) PCT Filed: May 10, 2019

(86) PCT No.: PCT/CN2019/086355
§ 371 (c)(1),
(2) Date: Jul. 21, 2020

(87) PCT Pub. No.: WO2019/218937
PCT Pub. Date: Nov. 21, 2019

(65) Prior Publication Data
US 2020/0374704 A1  Nov. 26, 2020

(30) Foreign Application Priority Data
May 17, 2018 (CN) .......................... 201810474440.9

(51) Int. Cl.
*H04L 5/00* (2006.01)
*H04W 16/14* (2009.01)
(Continued)

(52) U.S. Cl.
CPC .......... *H04W 16/14* (2013.01); *H04B 7/0413* (2013.01); *H04L 5/0053* (2013.01);
(Continued)

(58) Field of Classification Search
CPC ..... H04W 16/14; H04W 48/16; H04W 24/08; H04W 74/0808; H04W 4/06; H04W 72/0453; H04L 5/0085
See application file for complete search history.

(56) References Cited

U.S. PATENT DOCUMENTS

2016/0338081 A1* 11/2016 Jiang ...................... H04L 5/1469
2018/0049176 A1*  2/2018 Park ........................ H04L 5/0053
(Continued)

FOREIGN PATENT DOCUMENTS

CN  104768160 A   7/2015
CN  106255124 A  12/2016
(Continued)

OTHER PUBLICATIONS

Huawei et al:"System Information Scheduling and Update", 3GPP Draft; R2-162325 System Information Scheduling and Update, 3rd Generation Partnership Project (3GPP), Mobile Competence Centre: 650, Route Des Lucioles ; F-06921 Sophia-Antipolis Cedex ; France vol. RAN WG2, No. Dubrovnik, Croatia; Apr. 11, 2016-Apr. 15, 2016 Apr. 2, 2016 (Apr. 2, 2016), XP051082383,Retrieved from the Internet: URL http://www.3gpp/org/ftp/tsg_ran/WG2RL2/TSGR2_93bis/Docs/[retrieved on Apr. 2, 2016] * section 2.1.1 *.
(Continued)

*Primary Examiner* — Diane L Lo
*Assistant Examiner* — Abusayeed M Haque
(74) *Attorney, Agent, or Firm* — Xsensus LLP

(57) ABSTRACT

Provided are an electronic device and a method for wireless communication, and a computer readable storage medium, the electronic device comprising: a processing circuit, configured to: perform periodic channel detection for a plurality of unlicenced channels in an unlicenced band according to a first period; and respectively send master system information blocks MIB having the same content to user devices
(Continued)

over at least some of the available unlicensed channels in the unlicensed band indicated by the channel detection results, the MIBs comprising part of the minimum system information.

18 Claims, 9 Drawing Sheets

(51) Int. Cl.
    *H04W 72/04*      (2009.01)
    *H04B 7/0413*     (2017.01)
    *H04W 4/06*       (2009.01)
    *H04W 48/16*      (2009.01)

(52) U.S. Cl.
    CPC ............. *H04W 4/06* (2013.01); *H04W 48/16* (2013.01); *H04W 72/0453* (2013.01)

(56) References Cited

U.S. PATENT DOCUMENTS

| | | | |
|---|---|---|---|
| 2018/0077690 A1* | 3/2018 | Park | H04W 76/40 |
| 2018/0242282 A1* | 8/2018 | Li | H04W 72/08 |
| 2019/0215699 A1 | 7/2019 | Li | |
| 2019/0246335 A1* | 8/2019 | Mukherjee | H04W 48/08 |
| 2020/0221272 A1* | 7/2020 | Sakurada | G06V 10/60 |

FOREIGN PATENT DOCUMENTS

| | | |
|---|---|---|
| CN | 106470425 A | 3/2017 |
| CN | 107645730 A | 1/2018 |
| EP | 3316511 A1 | 5/2018 |
| WO | WO-2017100355 A1 | 6/2017 |
| WO | WO-2018045681 A1 | 3/2018 |

OTHER PUBLICATIONS

OPPO :"Discussion on Impact of LBT to Minimum System Information for NR-U", DGPP Draft; R2-1806700 Discussion on Impact of LBT to Minimum System Information for NR-U, 3rd Generation Partnership Project (3GPP), Mobile Competence Centre; 650, Route Des Lucioles ; F-06921 Sophi vol. RAN WG2, No. Busan, May 25, 2018 May 10, 2018 (May 10, 2018), XP051463835, Retrieved from the Internet URL:http://www.3gpp.org/ftp/tsg%5Fran/WG2% 5 FRL2/TSGR2%5 F102/Docs (retrieved on May 10, 2018] section 4.
OPPO;"Initial access procedure on NR-U" 3GPP Draft; R1-1806853, 3rd,Generation Partnership Project (3GPP), Mobile Competence Centre; 650, Route Des Lucioles : F-06921 Sophia-Antipolis Cedex ; France vol. RAN WG1, No. Busan, Korea; May 21, 2018-May 25, 2018 May 11, 2018 (May 11, 2018),XP051462001,Retrieved from the Internet: URL:http://www.3gpp.org/ftp/tsg%5Fran/WG1% 5 FRL1/TSGR1%5 F93/Docs [retrieved on May 11, 2018] section 2.2.
International Search Report and Written Opinion dated Jul. 31, 2019 for PCT/CN2019/086355 filed on May 10, 2019, 8 pages including English Translation of the International Search Report.

* cited by examiner

ELECTRONIC DEVICE AND METHOD FOR WIRELESS COMMUNICATION, AND COMPUTER READABLE STORAGE MEDIUM

CROSS-REFERENCE TO RELATED APPLICATIONS

The application is based on PCT filing PCT/CN2019/086355, filed May 10, 2019, which claims the priority to Chinese Patent Application No. 201810474440.9, filed May 17, 2018 with the China National Intellectual Property Administration, each of which is incorporated herein by reference in its entirety.

FIELD

The present disclosure relates to the technical field of wireless communications, and in particular to random access on an unlicensed frequency band. More specifically, the present disclosure relates to an electronic apparatus and a method for wireless communications and a computer-readable storage medium.

BACKGROUND

As a next generation of radio access scheme of Long Term Evolution (LTE), New Radio (NR) is a radio access technology (RAT) different from the LTE. NR is an access technology applicable to various use cases such as Enhanced mobile broadband (eMBB), Massive machine type communications (mMTCs) and Ultra reliable and low latency communications (URLLCs).

In NR, an unlicensed frequency band may also be used for communications. The unlicensed frequency band may be used in a standalone (SA) scenario and a licensed assisted access (LAA) scenario. In the SA scenario, data and control signaling are both transmitted on an unlicensed frequency band, and in the LAA scenario, control signaling may be transmitted on a licensed frequency band.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to: perform periodical channel detection on a plurality of unlicensed channels on an unlicensed frequency band at a first period; and transmit, on each of at least a part of unlicensed channels of which channel detection results indicate that the unlicensed channels are available, a master information block (MIB) with the same content to user equipment (UE), respectively, the MIB including a part of minimum system information.

According to another aspect of the present disclosure, a method for wireless communications is provided. The method includes: performing periodical channel detection on a plurality of unlicensed channels on an unlicensed frequency band at a first period; and transmitting, on each of at least a part of unlicensed channels of which channel detection results indicate that the unlicensed channels are available, a MIB with the same content to UE, respectively, the MIB including a part of minimum system information.

According to an aspect of the present disclosure, an electronic apparatus for wireless communications is provided. The electronic apparatus includes processing circuitry. The processing circuitry is configured to: determine a period for detecting a master information block (MIB); and detect a plurality of unlicensed channels on an unlicensed frequency band at the period to acquire the MIB, wherein the MIBs on the plurality of unlicensed channels have the same content, and the MIB includes a part of minimum system information.

According to an aspect of the present disclosure, a method for wireless communications is provided. The method includes: determining a period for detecting a master information block (MIB); and detecting a plurality of unlicensed channels on an unlicensed frequency band at the period to acquire the MIB, wherein the MIBs on the plurality of unlicensed channels have the same content, and the MIB includes a part of minimum system information.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatus and method according to the present disclosure, the MIBs are transmitted redundantly on an unlicensed frequency band, thereby increasing the probability that the user equipment can correctly detect the MIB in a SA scenario, thus realizing reliable transmission of the MIB.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF THE EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

Figure 1:
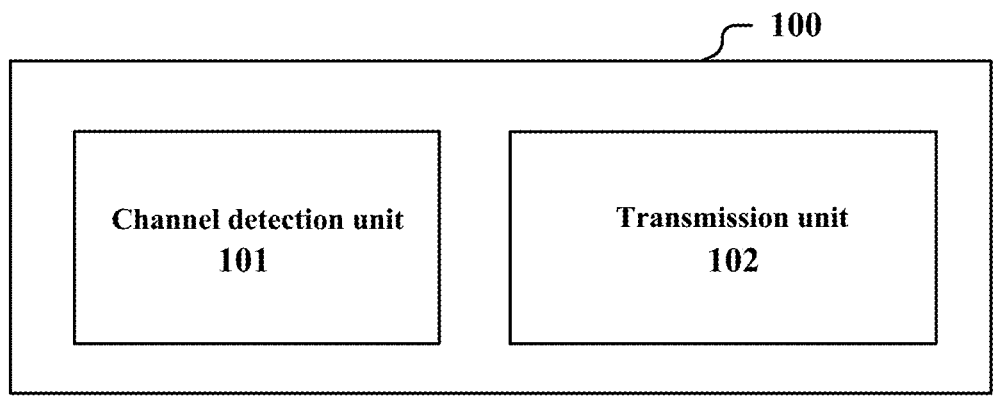
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes: a channel detection unit 101 and a transmission unit 102. The channel detection unit 101 is configured to perform periodical channel detection on a plurality of unlicensed channels on an unlicensed frequency band at a first period. The transmission unit 102 is configured to transmit, on each of at least a part of unlicensed channels of which channel detection results indicate that the unlicensed channels are available, a MIB with the same content to user equipment, respectively, where the MIB includes a part of minimum system information.

The channel detection unit 101 and the transmission unit 102 may be implemented by one or more processing circuitries, and the processing circuitry, for example, may be implemented as a chip. Moreover, it should be noted that, functional units in the apparatus shown in FIG. 1 are only logic modules which are divided based on the specific functions thereof, and are not intended to limit the implementations.

The electronic apparatus 100, for example, may be arranged on a base station side or may be communicatively connected to a base station. It should be noted that the electronic apparatus 100 may be implemented at a chip level or a device level. For example, the electronic apparatus 100 may function as a base station itself, and may include an external device such as a memory and a transceiver (not shown in FIG. 1). The memory may store programs and related data information for implementing various functions by the base station. The transceiver may include one or more communication interfaces to support communication with different devices (for example, user equipment and other base stations). The implementation of the transceiver is not limited here. In addition, the base station described herein may further include a Transmitting and Receiving Point (TRP).

System Information (SI) may be divided into minimum SI and other SI. The minimum SI may be broadcast periodically, and includes basic information required for initial access and information required for acquiring other SI. The other SI may be broadcast periodically or may be provided on demand. The minimum SI includes a master information block (MIB) and remaining minimum system information (RMSI). The MIB and RMSI may be transmitted via different channels, and the UE may receive the MIB first, and then receive the RMSI.

In a SA scenario, the MIB is transmitted on an unlicensed frequency band. Due to the uncertainty of the channel, the UE may not receive the MIB stably. Similarly, the UE may not receive the RMSI stably.

In the electronic apparatus 100, the channel detection unit 101 is used to perform channel detection, such as Listen Before Talk (LBT), on a plurality of unlicensed channels on an unlicensed frequency band to determine whether the channels are available. If it is detected that N unlicensed channels are available, the transmission unit 102 transmits MIBs with the same content on the N channels or a part of the N channels, that is, to perform redundant transmission in the frequency domain, so as to ensure that there is an available unlicensed channel to achieve transmission of the MIB. Accordingly, the UE may listen on multiple unlicensed channels to ensure that the MIB can be received correctly.

Figure 2:
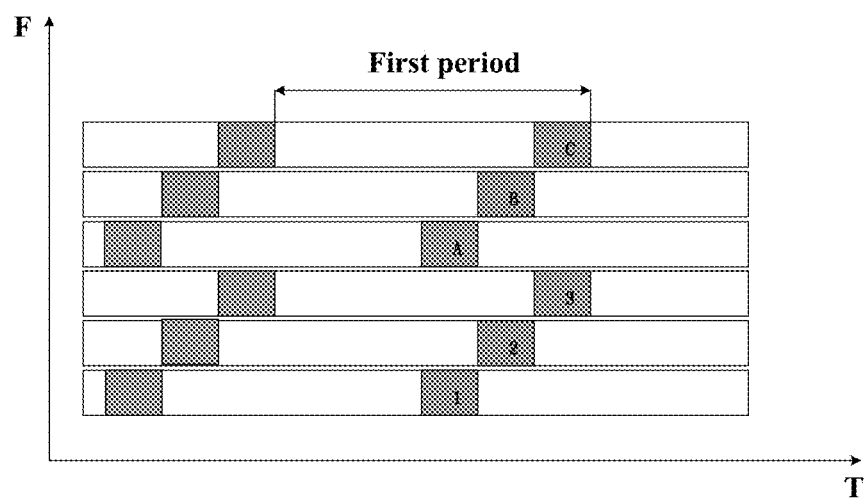
FIG. 2 shows a schematic example of redundant transmission of MIBs.

FIG. 2 shows a schematic example of redundant transmission of MIBs according to an embodiment of the present disclosure. As shown in FIG. 2, each gray-filled block represents a transmitted MIB. The MIBs represented by block 1 and block A have the same information, the MIBs represented by block 2 and block B have the same information, and the MIBs represented by block 3 and block C have the same information.

In an example, one or more different unlicensed channels may be designated as a fixed system information access anchor for different operators. In this case, the channel detection unit 101 detects the designated unlicensed channels and transmits the MIBs on the unlicensed channels of which the detection results indicate that the channels are available.

Figure 3:
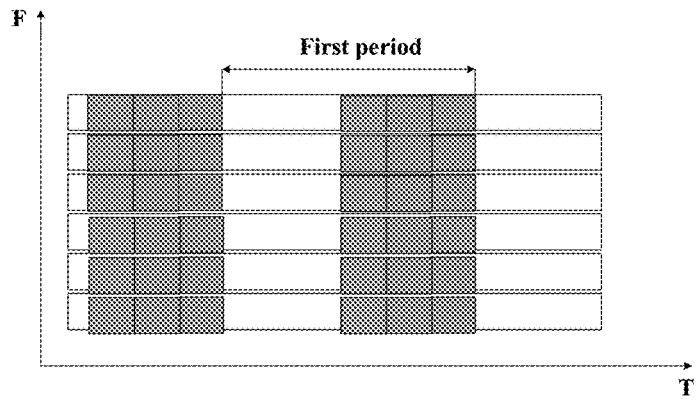
FIG. 3 shows another schematic example of redundant transmission of MIBs.

In addition, the transmission unit 102 may be further configured to transmit the MIB on each of the at least a part of unlicensed channels for multiple times consecutively within one first period, that is, to perform redundant transmission in the time domain. In the embodiment shown in FIG. 2, if the MIBs represented by blocks 1 to 3 and the MIBs represented by A to C have the same information, redundant transmission of the MIB in the frequency domain and in the time domain are both realized simultaneously. Moreover, FIG. 3 shows another schematic example of redundant transmission of MIBs in the frequency domain and in the time domain, in which the MIB is transmitted on each of the unlicensed channels for multiple times within one first period.

For example, the transmission unit 102 may be configured to transmit the MIB via a physical broadcast channel (PBCH).

As described above, the MIB is transmitted periodically with a transmitting period of the first period, which may be called as a PBCH period. It should be understood that the terms of "first", "second", and the like herein are used only for distinguishing, and do not represent any meaning of order or importance.

The channel detection unit 101 may adjust the first period based on utilization status of the at least a part of unlicensed channels, and the transmission unit 102 may include information about adjusting of the first period in the MIB. The information about adjusting may include, for example, a size of the adjusted period or a rule for adjusting. Due to the uncertainty of the unlicensed channel, compared with a scenario where the MIB is transmitted on a licensed frequency band, the first period for the unlicensed channel may be set to be shorter.

The utilization status of the unlicensed channels may include, for example, one or more of the following: the number of times for transmitting the MIB successfully in a predetermined time period; time elapsed since last time transmitting the MIB successfully. For example, if the number of times for transmitting the MIB successfully in the predetermined time period exceeds a preset threshold, it may be determined that the channel is idle, and a larger first period may be set; and if the number of times for transmitting the MIB successfully in a predetermined time period does not exceed the preset threshold, a smaller first period should be set. Similarly, if the time elapsed since last transmitting the MIB successfully is shorter than a preset value (the preset value may be the first period or may be a multiple of the first period), it may be determined that the channel is idle, and a larger first period may be set; and if the time elapsed since last transmitting the MIB successfully is not shorter than the preset value, a smaller first period should be set.

As an example, the channel detection unit 101 may be further configured to perform periodic channel detection on a particular unlicensed channel at a second period, and the transmission unit 102 may be further configured to transmit, on the particular unlicensed channel, RMSI in a case that a channel detection result indicates that the particular unlicensed channel is available.

Figure 4:
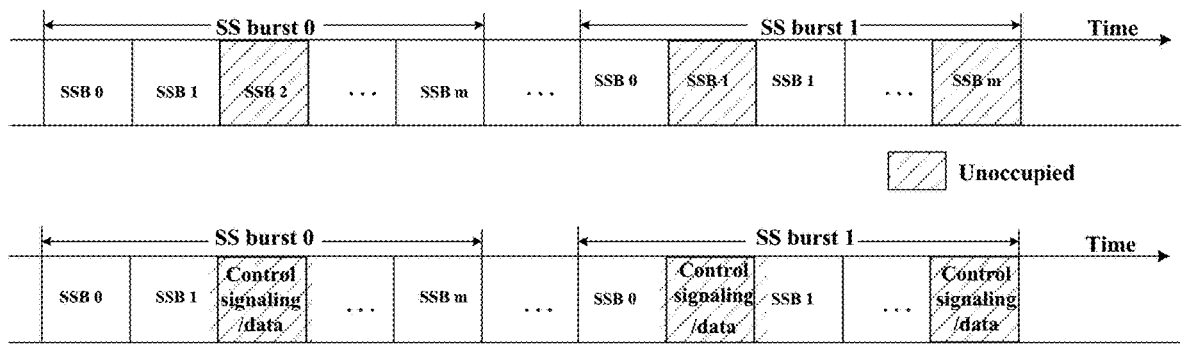
FIG. 4 shows an example of a synchronization signal block.

The RMSI may include information indicating different contents contained in a synchronization signal block (SSB). The SSB is used for completing cell searching and synchronization, and includes a primary synchronization signal (PSS), a secondary synchronization signal (SSS), and a PBCH. As shown in FIG. 4, multiple SSBs form an SS burst. In practice, there are cases where some of time-frequency resources allocated to the SSB are not used, that is, the time-frequency resources originally reserved for the SSB are idle, so that these time-frequency resources may be used for transmitting actual control signaling and data, as shown by the blocks filled with gray diagonal lines in FIG. 4. The information of positions of the unoccupied SSBs is required to be explicitly indicated by the base station side to the UE side, so as to ensure that the UE side does not receive the SSB at these positions, or receives control signaling and data at these positions. The RMSI may include the information of the positions. Therefore, the RMSI is very important in correctly receiving other control signaling and data by the UE and in indicating a position where the SSB is actually transmitted.

The RMSI may be transmitted via a physical downlink share channel (PDSCH). Due to the uncertainty of the unlicensed channel, each time the RMSI is to be transmitted, the channel detection unit 101 is required to perform channel detection on the unlicensed channels to ensure that the channel is available. The transmitting period (or an attemption transmitting period) of the RMSI is called a second period. In order to increase the probability that the UE receives the RMSI, the transmission unit 102 may transmit the RMSI on the particular unlicensed channel consecutively for multiple times within one second period. The particular unlicensed channel here is, for example, an unlicensed channel which the UE has accessed or an unlicensed channel via which the MIB is successfully received.

For example, the MIB may include information of a receiving window for the RMSI. The UE determines a position for receiving the RMSI based on the information of the receiving window. The UE may attempt to receive the RMSI in the receiving window until the RMSI is received successfully.

Figure 5:
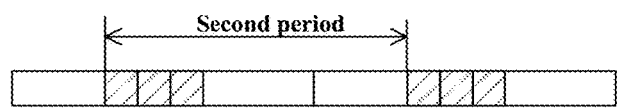
FIG. 5 shows an example of transmission of remaining minimum system information.

Alternatively, information of the number of times for transmitting the RMSI within one second period may be included in the MIB. Since the UE has received the MIB first, the UE may acquire the information of the number of times from the MIB to attempt to perform detection for the number of times corresponding to the information. FIG. 5 shows an example in which the RMSI is transmitted for three times within one second period, in which each of the blocks filled with diagonal lines represents one transmission of the RMSI. Correspondingly, the reception of the RMSI may be attempted for three times at the UE side.

In addition, the channel detection unit 101 may adjust the second period based on utilization status of the particular unlicensed channel, and the transmission unit 102 may include information about adjusting of the second period in the MIB. The UE may acquire the adjustment of the transmitting period of the RMSI based on the received MIB. The information about adjusting may include, for example, a size of the adjusted period or a rule for adjusting.

For example, the utilization status of the particular unlicensed channel may include one or more of the following: the number of times for transmitting the RMSI successfully in a predetermined time period; and a time elapsed since last transmitting the RMSI successfully. For example, if the number of times for transmitting the RMSI successfully in a predetermined time period exceeds a preset threshold, it is determined that the channel is idle, and a larger second period may be set; and if the number of times for transmitting the RMSI successfully in a predetermined time period does not exceed the preset threshold, a smaller second period should be set. Similarly, if the time elapsed since last transmitting the RMSI successfully is shorter than a preset value (the preset value may be the second period or may be a multiple of the second period), it is determined that the channel is idle, and a larger first period may be set; and if the time elapsed since last transmitting the RMSI successfully is not shorter than the preset value, a smaller first period should be set.

Figure 6:
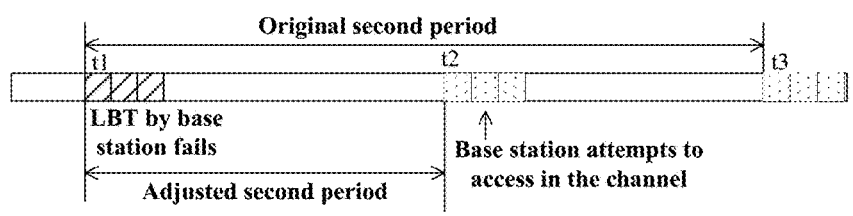
FIG. 6 shows a schematic example of adjustment of a transmitting period of remaining minimum system information.

FIG. 6 shows a schematic example of adjustment of a second period. As shown in FIG. 6, the base station attempts to access the channel at a time instant t1, and the LBT fails, so the RMSI is not transmitted. According to the normal second period, the base station should attempt to transmit the RMSI at a time instant t3. However, since the RMSI is not successfully transmitted at the time instant t1, the second period is adjusted, for example, the second period is reduced to be a half of the original second period, so the base station attempts to access the channel to transmit the RMSI at a time instant t2. The information about adjusting of the second period may be transmitted to the UE via the MIB, such that the UE can know to attempt to receive the RMSI at the time instant t2.

As mentioned above, the utilization status of the channel is required to be saved for adjusting the transmitting period of the MIB and/or the RMSI. Therefore, the electronic apparatus 100 may further include a storage which is configured to store information of utilization status of the at least a part of the unlicensed channels.

With the electronic apparatus 100 according to the present disclosure, the MIB and RMSI are transmitted redundantly, realizing reliable transmission of the MIB and the RMSI in the SA scenario.

Second Embodiment

Figure 7:
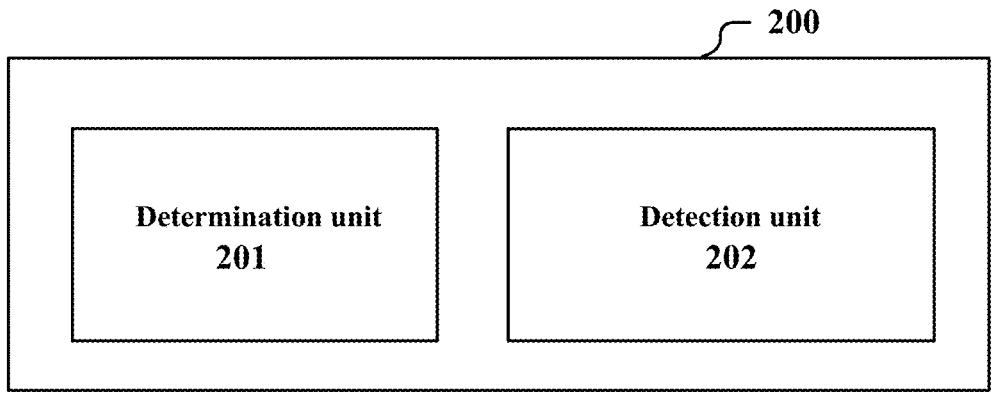
FIG. 7 is a block diagram showing functional modules of an electronic apparatus for wireless communications according to another embodiment of the present disclosure.

FIG. 7 is a block diagram showing functional modules of an electronic apparatus 200 for wireless communications according to an embodiment of the present disclosure. As shown in FIG. 7, the electronic apparatus 200 includes: a determination unit 201 and a detection unit 202. The determination unit 201 is configured to determine a period for detecting the MIB. The detection unit 202 is configured to detect a plurality of unlicensed channels on an unlicensed frequency band at the period to acquire the MIB, where the MIBs on the plurality of unlicensed channels have the same content, and the MIB includes a part of minimum system information.

The determination unit 201 and the detection unit 202 may be implemented by one or more processing circuitries, and the processing circuitry, for example, may be implemented as a chip. Moreover, it should be noted that, functional units in the apparatus shown in FIG. 7 are only logic modules which are divided based on the specific functions thereof, and are not intended to limit the implementations.

The electronic apparatus 200, for example, may be arranged on user equipment (UE) side or may be communicatively connected to UE. It should be noted that the electronic apparatus 200 may be implemented at a chip level or a device level. For example, the electronic apparatus 200 may function as user equipment itself, and may include an external device such as a memory and a transceiver (not shown in FIG. 7). The memory may be configured to store programs and related data information for implementing various functions by the user equipment. The transceiver may include one or more communication interfaces to support communication with different devices (for example, a base station, other user equipment or the like). The implementation of the transceiver is not limited here.

In order to normally complete cell search, synchronization, and other related measurements, the UE needs to acquire system information from a base station, where the system information includes MIB, RMSI, and so on. The MIBs may be periodically broadcasted and transmitted, for example, via a PBCH.

As mentioned above, in order to allow the UE to listen to the MIB more reliably, the base station may transmit MIBs with the same content on the plurality of unlicensed channels. The determination unit 101 determines the period for detecting the MIBs. The period may be determined according to, for example, one or more of the following: a transmitting period of the MIB, a quantity of electricity of UE where the electronic apparatus 200 is located. For example, if the transmitting period is long, a long period for detecting the MIB by the UE is set; and if the quantity of electricity of the UE is low, a long period for detecting the MIB by the UE is set to reduce power consumption.

The detection unit 202 periodically attempts to access the plurality of unlicensed channels to listen to the MIB at the period determined by the determination unit 201. In the SA scenario, the detection unit 202 may, for example, determine whether a channel is available by performing LBT, and access the channel if the LBT indicates that the channel is available, to acquire the MIB transmitted thereon.

In an example, one or more different unlicensed channels may be designated as a fixed system information access anchor for different operators. In this case, the detection unit 202 detects only the designated unlicensed channels and receives the MIB on an unlicensed channel of which a detection result indicates that the channel is available.

In an example, in order to increase the probability that the UE correctly receives the MIB, there may be multiple consecutive MIBs with the same content in one transmitting period of the MIB.

After receiving the MIB, the UE continues to receive the RMSI. For example, the RMSI may be transmitted via a PDSCH. As an example, the determination unit 201 is further configured to determine, based on the acquired MIB, a receiving window for receiving the RMSI, and the detection unit 202 is further configured to perform channel detection on a particular unlicensed channel within the receiving window to receive the RMSI.

Similarly, the detection unit 202 may, for example, perform LBT on a particular unlicensed channel to determine whether the channel is available, and attempt to receive the RMSI on the particular unlicensed channel if the LBT indicates that the channel is available until the RMSI is received successfully.

For example, the MIB may further include a transmitting period of the RMSI and the number of times N for transmitting the RMSI in one transmitting period, and the detection unit 202 is configured to receive the RMSI for the number of times N within the receiving window a length of which equals to the transmitting period of the RMSI, N being a positive integer. Referring back to the example shown in FIG. 5, the second period shown in FIG. 5 is the transmitting period of the RMSI, and the detection unit 202 attempts to receive the RMSI for three times within the second period. In the example, N=3. It should be understood that if the RMSI is successfully received with the number of attempts less than N, following reception attempts are no longer performed. For example, in the example shown in FIG. 5, if the RMSI is successfully received in the second attempt, the third reception attempt is no longer performed.

As mentioned above, the base station may adjust the transmitting period of the MIB and the transmitting period of the RMSI based on the utilization status of the unlicensed channels. For example, the base station adjusts the transmitting period of the MIB based on the number of times for transmitting the MIBs successfully in the predetermined time period or the time elapsed after since last transmitting the MIB successfully, and the base station adjusts the transmitting period of the RMSI based on the number of times for transmitting the RMSI successfully in the predetermined time period or the time elapsed since last transmitting the RMSI successfully.

Therefore, the MIB may further include information of adjusting of a transmitting period of the RMSI and/or information of adjusting of a transmitting period of the MIB, and the detection unit 202 is configured to receive the RMSI or the MIB based on the adjusted transmitting period. Similarly, the information about adjusting may include, for example, a size of the adjusted transmitting period or a rule for adjusting.

For example, referring back to the example shown in FIG. 6, the adjusted transmitting period of the RMSI is a half of the original transmitting period of the RMSI, and the information about adjusting may be included in the previously received MIB. The detection unit 202 receives the RMSI with the adjusted transmitting period. For example, the detection unit 202 begins to attempt to receive the RMSI within a period starting at a time instant t2 (assuming that no delay is considered).

With the electronic apparatus 200 according to the present disclosure, the MIB and RMSI transmitted redundantly can be received, realizing reliable transmission of the MIB and the RMSI in the SA scenario.

Third Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 8:
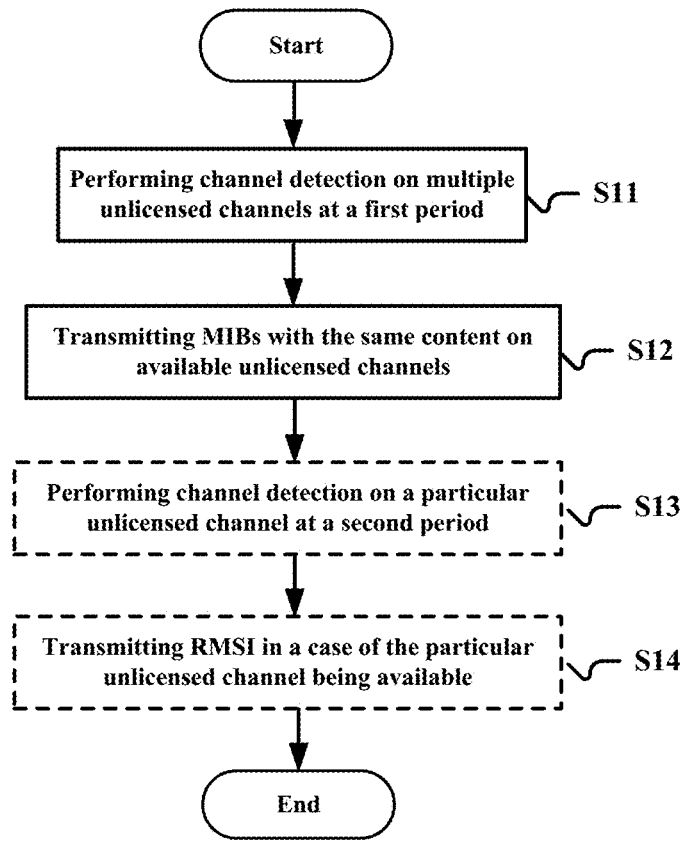
FIG. 8 is a flow chart of a method for wireless communications according to an embodiment of the present disclosure.

FIG. 8 shows a flow chart of a method for wireless communications according to an embodiment of the present disclosure. As shown in FIG. 8, the method includes: performing periodical channel detection on a plurality of unlicensed channels on an unlicensed frequency band at a first period (S11); and transmitting, on each of at least a part of unlicensed channels of which channel detection results indicate that the channels are available, a master information block (MIB) with the same content to user equipment respectively (S12). The MIB includes a part of minimum system information.

In step S12, the MIB may be transmitted on each of the at least a part of unlicensed channels for multiple times consecutively within one first period. For example, the MIB may be transmitted via a physical broadcast channel.

In step S11, the first period may be adjusted based on utilization status of the at least a part of unlicensed channels, and in step S12, information about adjusting of the first period is included in the MIB. For example, the utilization status of the at least a part of the unlicensed channels includes one or more of the following: the number of times for transmitting the MIB successfully in a predetermined time period; and a time elapsed since last transmitting the MIB successfully. The information of utilization status of the at least a part of the unlicensed channels, for example, may be stored in a storage.

In addition, as shown by the dashed line block in FIG. 8, the method may further include the following steps: performing periodical channel detection on a particular unlicensed channel at a second period (S13); and transmitting, on a particular unlicensed channel, remaining minimum system information (RMSI) in a case that a channel detection result indicates that the particular unlicensed channel is available (S14).

The RMSI includes information indicating different contents contained in a synchronization signal block. The RMSI may be transmitted via a physical downlink share channel. The MIB may include information of a receiving window for the RMSI.

In step S14, the RMSI may be transmitted on the particular unlicensed channel consecutively for multiple times within one second period. Information of the number of times for transmitting the RMSI within one second period may be included in the MIB.

In step S13, the second period may further be adjusted based on utilization status of the particular unlicensed channel, and information about adjusting of the second period is included in the MIB. The utilization status of the particular unlicensed channel includes one or more of the following: the number of times for transmitting the RMSI successfully in a predetermined time period; and a time elapsed since last transmitting the RMSI successfully.

Figure 9:
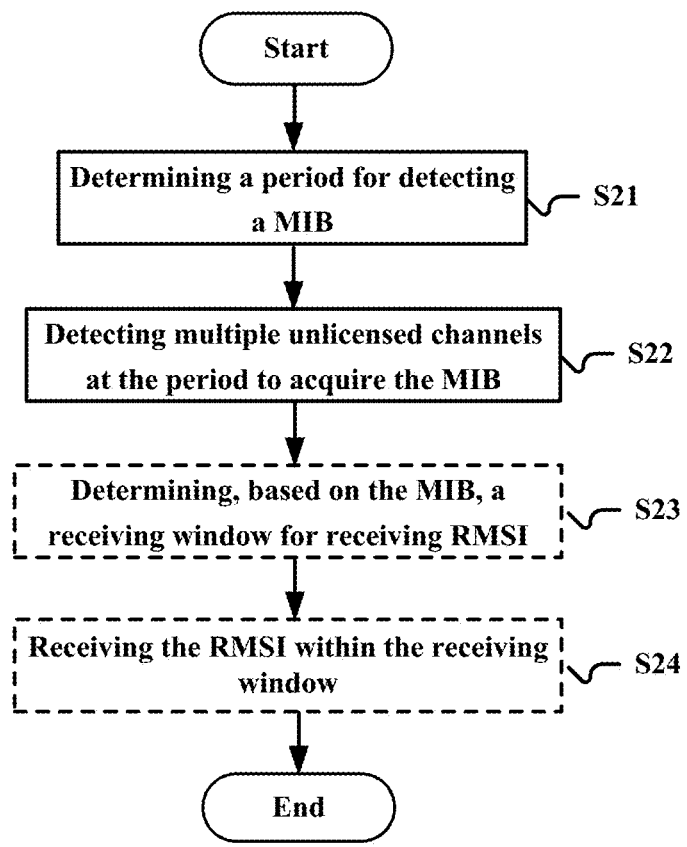
FIG. 9 is a flow chart of a method for wireless communications according to another embodiment of the present disclosure.

FIG. 9 shows a flow chart of a method for wireless communications according to another embodiment of the present disclosure. As shown in FIG. 9, the method includes: determining a period for detecting a master information block (MIB) (S21); and detecting a plurality of unlicensed channels on an unlicensed frequency band at the period to acquire the MIB (S22). The MIB on each of the multiple unlicensed channels has the same content, and the MIB includes a part of minimum system information.

In step S21, the period may be determined according to one or more of the following: a transmitting period of the MIB, a quantity of electricity of user equipment where the electronic apparatus is located. The MIB may be received via a physical broadcast channel.

There may be multiple consecutive MIBs with the same content in one transmitting period of the MIB.

As shown by the dashed line block in FIG. 9, the method may further include: determining, based on the acquired MIB, a receiving window for receiving the RMSI (S23); and performing channel detection on a particular unlicensed channel within the receiving window to receive the RMSI (S24).

The MIB may further include a transmitting period of the RMSI and the number of times N for transmitting the RMSI in one transmitting period. In step S24, the RMSI is received for the number of times N within the receiving window a length of which equals to the transmitting period of the RMSI, where N is a positive integer. The RMSI may be received via a physical downlink share channel.

In addition, the MIB may further include information of adjusting of a transmitting period of the RMSI and/or information of adjusting of a transmitting period of the MIB. In step S24, the RMSI or the MIB is received based on the adjusted transmitting period.

It should be noted that the above methods may be performed in combination or separately. Details of the above methods are described in detail in the first to second embodiments, and are not repeated herein.

The technology according to the present disclosure is applicable to various products.

For example, the electronic apparatus 100 may be implemented as various base stations. The base station may be implemented as any type of evolution Node B (eNB) or gNB (a 5G base station). The eNB includes, for example, a macro eNB and a small eNB. The small eNB may be an eNB, such as a pico eNB, a micro eNB, and a home (femto) eNB, which covers a cell smaller than a macro cell. The case for the gNB is similar to the above. Alternatively, the base station may be implemented as any other type of base station, such as a NodeB and a base transceiver station (BTS). The base station may include a body (which is also referred to as a base station device) configured to control wireless communications; and one or more remote radio heads (RRHs) arranged in a different position from the body. In addition, various types of user equipments may operate as the base station by temporarily or semi-persistently executing a base station function.

The electronic apparatus 200 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

Application Examples Regarding a Base Station

First Application Example

Figure 10:
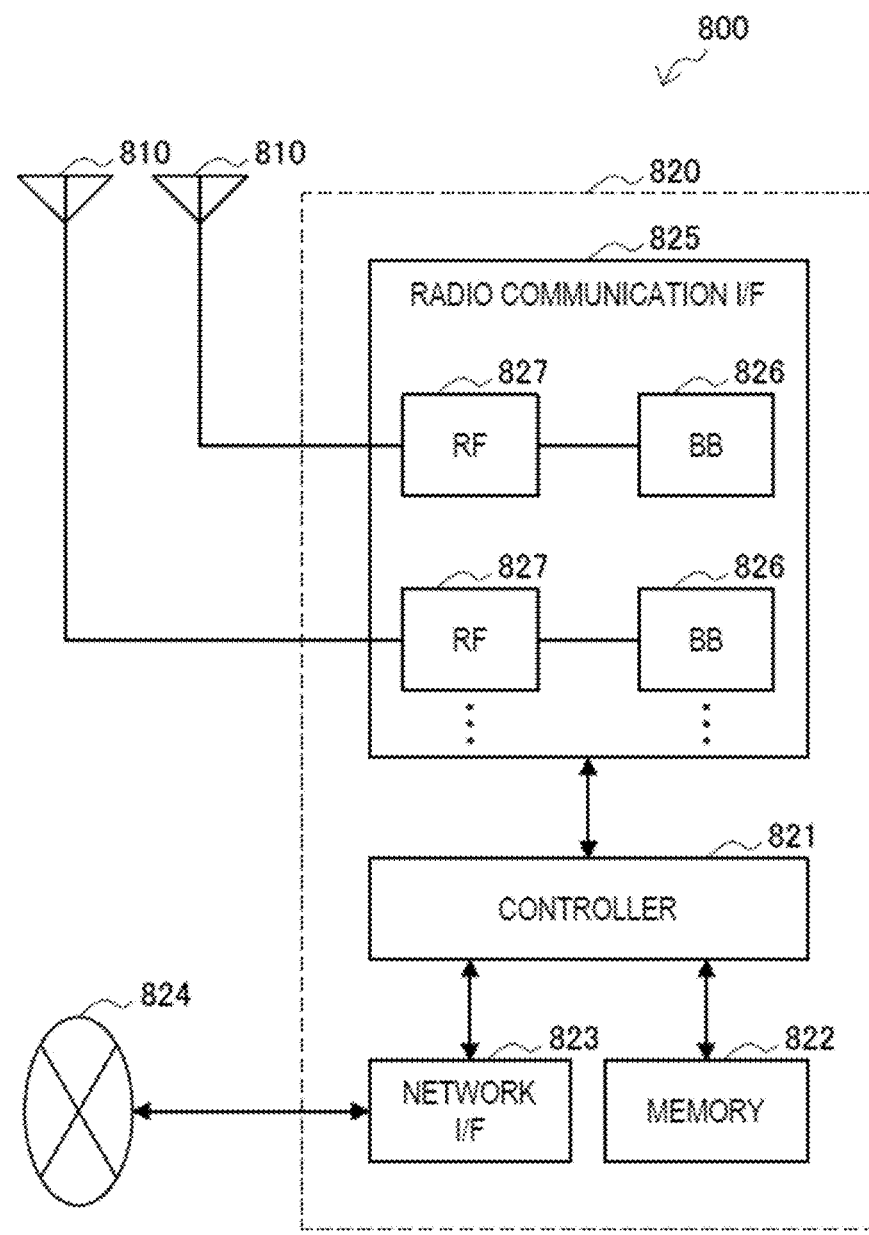
FIG. 10 is a block diagram showing a first example of a schematic configuration of an eNB or a gNB to which the technology of the present disclosure may be applied.

FIG. 10 is a block diagram showing a first example of a schematic configuration of an eNB or a gNB to which the technology of the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 10, the eNB 800 may include the multiple antennas 810. For example, the multiple antennas 810 may be compatible with multiple frequency bands used by the eNB 800. Although FIG. 10 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 10, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 10. For example, the multiple RF circuits 827 may be compatible with multiple antenna elements. Although FIG. 10 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 10, a transceiver of the electronic apparatus 100 may be implemented by the radio communication interface 825. At least a part of the functions may also be implemented by the controller 821. For example, the controller 821 may perform the functions of the channel detection unit 101 and the transmission unit 102 to realize redundant transmission and reliable transmission of the MIB and the RMSI in the SA scenario.

Second Application Example

Figure 11:
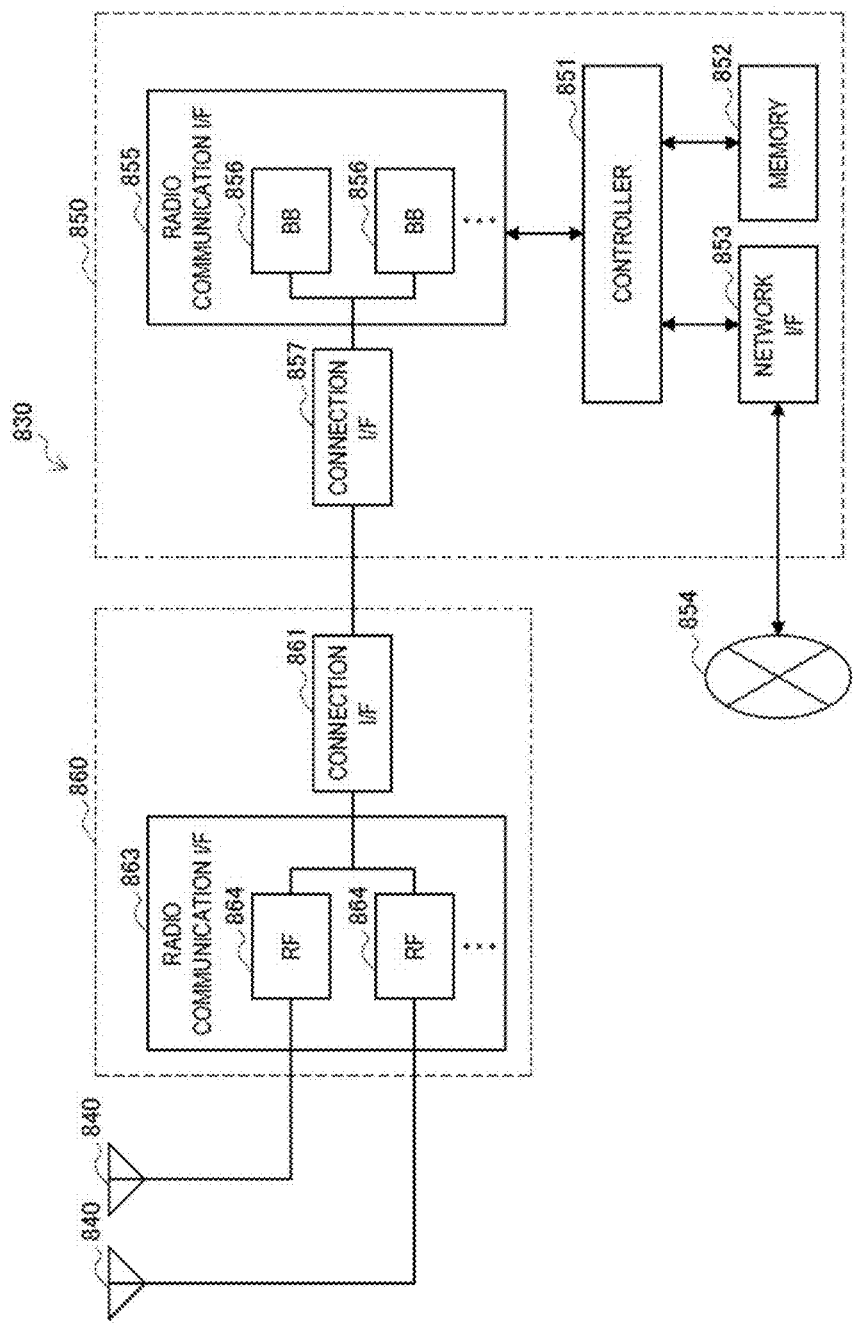
FIG. 11 is a block diagram showing a second example of a schematic configuration of an eNB or a gNB to which the technology according to the present disclosure may be applied.

FIG. 11 is a block diagram showing a second example of a schematic configuration of an eNB or a gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 11, the eNB 830 may include the multiple antennas 840. For example, the multiple antennas 840 may be compatible with multiple frequency bands used by the eNB 830. Although FIG. 11 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 12.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 10, except that the BB processor 856 is connected to an RF circuit 864 of the RRH 860 via the connection interface 857. As show in FIG. 11, the radio communication interface 855 may include the multiple BB processors 856. For example, the multiple BB processors 856 may be compatible with multiple frequency bands used by the eNB 830. Although FIG. 11 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 11. For example, the multiple RF circuits 864 may support multiple antenna elements. Although FIG. 11 shows the example in which the radio communication interface 863 includes the multiple RF circuits 864, the radio communication interface 863 may also include a single RF circuit 864.

In the eNB 800 shown in FIG. 11, a transceiver of the electronic apparatus 100 may be implemented by the radio communication interface 825. At least a part of the functions may also be implemented by the controller 821. For example, the controller 821 may perform the functions of the channel detection unit 101 and the transmission unit 102 to realize redundant transmission and reliable transmission of the MIB and the RMSI in the SA scenario.

Application Examples Regarding User Equipment

First Application Example

Figure 12:
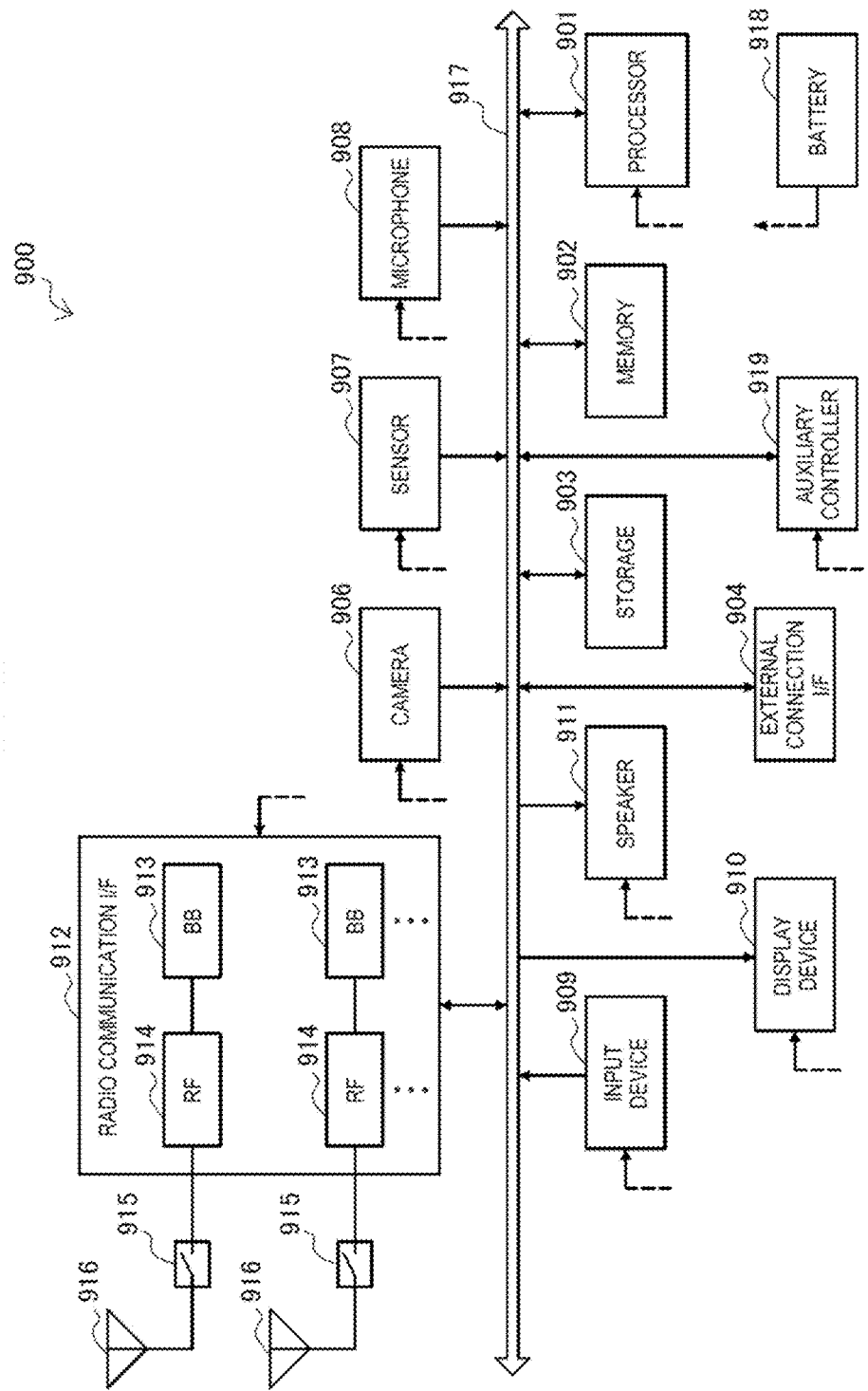
FIG. 12 is a block diagram showing an example of a schematic configuration of a smartphone to which the technology according to the present disclosure may be applied.

FIG. 12 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 12 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 12. Although FIG. 12 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 12. Although FIG. 12 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 12 via feeder lines that are partially shown as dashed lines in FIG. 12. The auxiliary controller 919, operates a minimum necessary function of the smart phone 900, for example, in a sleep mode.

In the smart phone 900 shown in FIG. 12, the transceiver of the electronic apparatus 200 may be implemented by the radio communication interface 912. At least a part of the functions may be implemented by the processor 901 or the auxiliary controller 919. For example, the processor 901 or the auxiliary controller 919 may perform the functions of the determination unit 201 and the detection unit 202 to realize reliable transmission of the MIBs and the RMSI in the SA scenario.

Second Application Example

Figure 13:
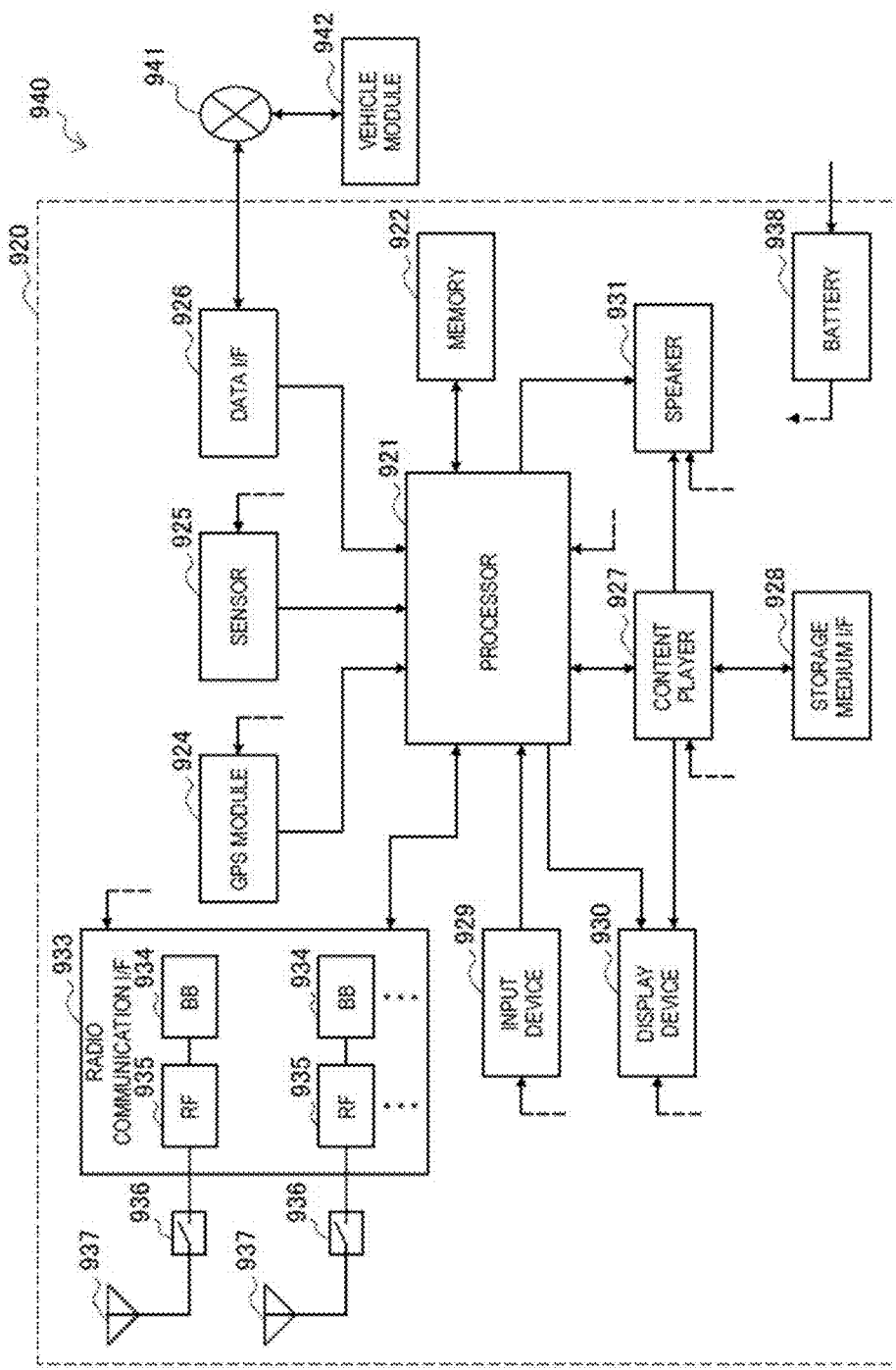
FIG. 13 is a block diagram showing an example of a schematic configuration of a car navigation apparatus to which the technology according to the present disclosure may be applied.

FIG. 13 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/de-multiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 13. Although FIG. 13 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 13, the car navigation apparatus 920 may include the multiple antennas 937. Although FIG. 13 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 13 via feeder lines that are partially shown as dash lines in FIG. 13. The battery 938 accumulates power supplied from the vehicle.

In the car navigation apparatus 920 shown in FIG. 13, the transceiver of the electronic apparatus 200 may be implemented by the radio communication interface 912. At least a part of the functions may be implemented by the processor 901 or the auxiliary controller 919. For example, the processor 901 or the auxiliary controller 919 may perform the functions of the determination unit 201 and the detection unit 202 to realize reliable transmission of the MIBs and the RMSI in the SA scenario.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1400 shown in FIG. 14) from a storage medium or network, wherein the computer is capable of implementing various functions when installed with various programs.

Figure 14:
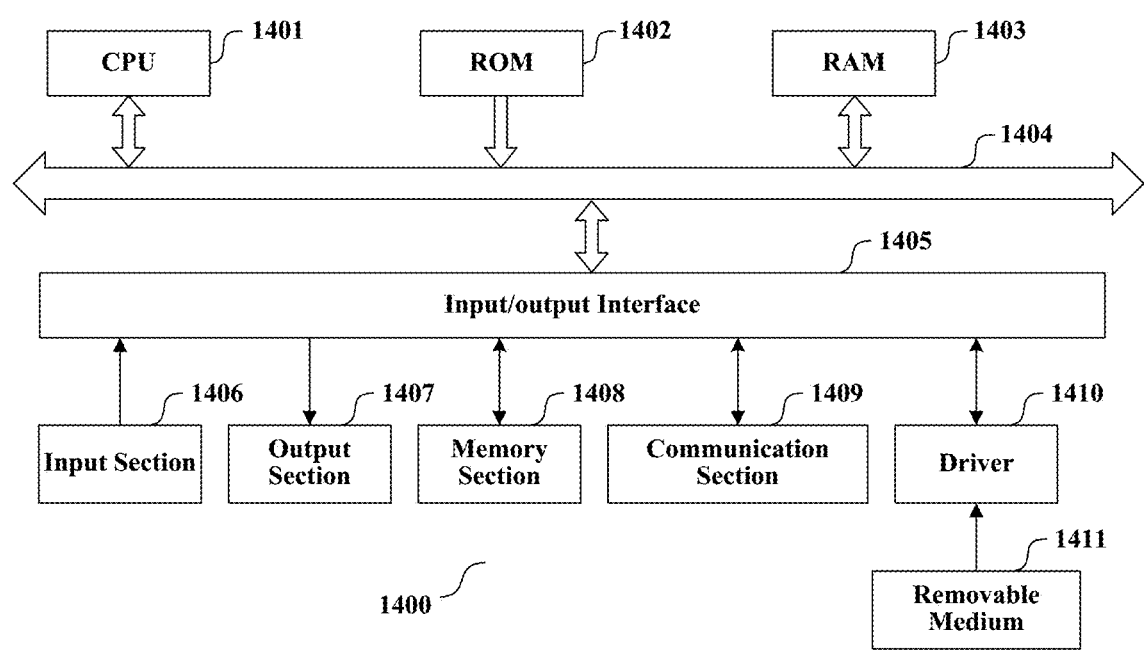
FIG. 14 is a block diagram of an exemplary block diagram illustrating the structure of a general purpose personal computer capable of realizing the method and/or device and/or system according to the embodiments of the present disclosure.

In FIG. 14, a central processing unit (CPU) 1401 executes various processing according to a program stored in a read-only memory (ROM) 1402 or a program loaded to a random access memory (RAM) 1403 from a memory section 1408. The data needed for the various processing of the CPU 1401 may be stored in the RAM 1403 as needed. The CPU 1401, the ROM 1402 and the RAM 1403 are linked with each other via a bus 1404. An input/output interface 1405 is also linked to the bus 1404.

The following components are linked to the input/output interface 1405: an input section 1406 (including keyboard, mouse and the like), an output section 1407 (including displays such as a cathode ray tube (CRT), a liquid crystal display (LCD), a loudspeaker and the like), a memory section 1408 (including hard disc and the like), and a communication section 1409 (including a network interface card such as a LAN card, modem and the like). The communication section 1409 performs communication processing via a network such as the Internet. A driver 1410 may also be linked to the input/output interface 1405, if needed. If needed, a removable medium 1411, for example, a magnetic disc, an optical disc, a magnetic optical disc, a semiconductor memory and the like, may be installed in the driver 1410, so that the computer program read therefrom is installed in the memory section 1408 as appropriate.

In the case where the foregoing series of processing is achieved through software, programs forming the software are installed from a network such as the Internet or a memory medium such as the removable medium 1411.

It should be appreciated by those skilled in the art that the memory medium is not limited to the removable medium 1411 shown in FIG. 14, which has program stored therein and is distributed separately from the apparatus so as to provide the programs to users. The removable medium 1411 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1402 and the memory section 1408 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n)" in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to
   perform periodical channel detection on a plurality of unlicensed channels on an unlicensed frequency band at a first period; and
   transmit, on each of at least a part of unlicensed channels of which channel detection results indicate that the unlicensed channels are available, for multiple times consecutively within one first period, a master information block (MIB) with the same content to user equipment, respectively, the MIB comprising a part of minimum system information.

2. The electronic apparatus according to claim 1, wherein the processing circuitry is configured to transmit the MIB via a physical broadcast channel.

3. The electronic apparatus according to claim 1, wherein the processing circuitry is further configured to:
   perform periodical channel detection on a particular unlicensed channel at a second period; and
   transmit, on the particular unlicensed channel, remaining minimum system information (RMSI) in a case that a channel detection result indicates that the particular unlicensed channel is available.

4. The electronic apparatus according to claim 3, wherein the MIB comprises information indicating a receiving window for the RMSI.

5. The electronic apparatus according to claim 3, wherein the processing circuitry is further configured to transmit the RMSI on the particular unlicensed channel for multiple times consecutively within one second period.

6. The electronic apparatus according to claim 5, wherein information of the number of times for transmitting the RMSI within one second period is comprised in the MIB.

7. The electronic apparatus according to claim 3, wherein the processing circuitry is further configured to adjust the second period based on utilization status of the particular unlicensed channel, and comprise information about adjusting of the second period in the MIB.

8. The electronic apparatus according to claim 7, wherein the utilization status of the particular unlicensed channel comprises one or more of the following: the number of times for transmitting the RMSI successfully in a predetermined time period; and time elapsed since last time transmitting the RMSI successfully.

9. The electronic apparatus according to claim 3, wherein the processing circuitry is configured to transmit the RMSI via a physical downlink share channel.

10. The electronic apparatus according to claim 3, wherein the RMSI comprises information indicating different contents comprised in a synchronization signal block.

11. An electronic apparatus for wireless communications, comprising:
    processing circuitry, configured to
    determine a period for detecting a master information block (MIB);
    detect a plurality of unlicensed channels on an unlicensed frequency band at the period to acquire the MIB, wherein the MIBs on the plurality of unlicensed channels have the same content, and the MIB comprises a part of minimum system information;
    determine, based on the acquired MIB, a receiving window for receiving remaining minimum system information (RMSI); and
    perform channel detection on a particular unlicensed channel within the receiving window to receive the RMSI.

12. The electronic apparatus according to claim 11, wherein the processing circuitry is configured to determine the period according to one or more of the following: a transmitting period of the MIB, a quantity of electricity of user equipment where the electronic apparatus is located.

13. The electronic apparatus according to claim 11, wherein there exist a plurality of consecutive MIBs with the same content in one transmitting period of the MIB.

14. The electronic apparatus according to claim 11, wherein the MIB further comprises a transmitting period of the RMSI and the number of times N for transmitting the RMSI in one transmitting period, and the processing circuitry is configured to receive the RMSI for N times within the receiving window a length of which equals to the transmitting period of the RMSI, N being a positive integer.

15. The electronic apparatus according to claim 11, wherein the MIB further comprises information of adjusting of a transmitting period of the RMSI and/or information of adjusting of a transmitting period of the MIB, and the processing circuitry is configured to receive the RMSI or the MIB based on the adjusted transmitting period.

16. An electronic apparatus for wireless communications, comprising:
    processing circuitry, configured to
    perform periodical channel detection on a plurality of unlicensed channels on an unlicensed frequency band at a first period; and
    transmit, on each of at least a part of unlicensed channels of which channel detection results indicate that the unlicensed channels are available, a master information block (MIB) with the same content to user equipment, respectively, the MIB comprising a part of minimum system information;
    wherein the processing circuitry is configured to adjust the first period based on utilization status of the at least a part of unlicensed channels, and comprise information about adjusting of the first period in the MIB.

17. The electronic apparatus according to claim 16, wherein the utilization status of the at least a part of the unlicensed channels comprises one or more of the following: the number of times for transmitting the MIB successfully in a predetermined time period; time elapsed since last time transmitting the MIB successfully.

18. The electronic apparatus according to claim 16, further comprising: a storage, configured to store information of the utilization status of the at least a part of the unlicensed channels.

* * * * *